(12) United States Patent
Kuramori

(10) Patent No.: US 8,473,160 B2
(45) Date of Patent: Jun. 25, 2013

(54) DEVICE FOR DETECTING STEERING OPERATION FORCE

(75) Inventor: Akira Kuramori, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 195 days.

(21) Appl. No.: 13/174,367

(22) Filed: Jun. 30, 2011

(65) Prior Publication Data

US 2012/0004808 A1  Jan. 5, 2012

(30) Foreign Application Priority Data

Jun. 30, 2010 (JP) ................................. 2010-149765

(51) Int. Cl.
*B60G 23/00* (2006.01)

(52) U.S. Cl.
USPC ........... 701/41; 701/42; 701/43; 701/45; 701/70; 701/71; 701/72; 701/78; 701/81; 180/197; 180/247; 180/248; 180/404; 180/409; 303/58; 303/143; 303/163; 280/5.51; 280/807; 242/390.8; 242/390.9; 318/434; 74/425; 74/498

(58) Field of Classification Search
USPC ............. 701/41, 42, 43, 45, 70, 71, 72, 78, 701/81; 180/9.1, 9.34, 197, 247, 248, 404, 180/409, 412, 415, 445, 446; 303/58, 146, 303/163; 280/5.51, 807; 242/390.8, 390.9; 318/434; 74/425, 498
See application file for complete search history.

(56) References Cited

U.S. PATENT DOCUMENTS

| | | | | |
|---|---|---|---|---|
| 4,869,335 A * | 9/1989 | Takahashi | ..................... | 180/412 |
| 5,014,801 A * | 5/1991 | Hirose | ........................... | 180/412 |
| 5,018,594 A * | 5/1991 | Takahashi et al. | ........... | 180/412 |
| 5,201,382 A * | 4/1993 | Edahiro et al. | ................ | 180/197 |
| 5,295,550 A * | 3/1994 | Chikuma | ...................... | 180/412 |
| 5,321,616 A * | 6/1994 | Okuda et al. | ..................... | 701/37 |
| 5,899,294 A * | 5/1999 | Shimizu et al. | ............... | 180/444 |
| 6,041,882 A * | 3/2000 | Bohner et al. | ................. | 180/402 |
| 6,042,196 A * | 3/2000 | Nakamura et al. | ................ | 303/7 |
| 6,053,270 A * | 4/2000 | Nishikawa et al. | ........... | 180/168 |
| 7,604,088 B2 * | 10/2009 | Nishizaki et al. | ............. | 180/446 |
| 7,810,608 B2 * | 10/2010 | Goto et al. | ..................... | 180/446 |
| 7,860,624 B2 * | 12/2010 | Kubota et al. | ................... | 701/41 |

FOREIGN PATENT DOCUMENTS

JP  2008-298430  12/2008

* cited by examiner

*Primary Examiner* — McDieunel Marc
(74) *Attorney, Agent, or Firm* — Thorpe North & Western LLP

(57) ABSTRACT

A steering operation force detection device for a steering wheel including a steering wheel rim having a right-side rim section and a left-side rim section. The device includes load cells that detect six component forces of the steering operation force acting on the right-side rim section and the left-side rim section consisting of forces in three axial directions and moments about three axes. The device includes a steering angle detection sensor that detects a steering angle of the steering wheel, and an inertial force component correcting unit that derives an inertial force component acting on the right-side rim section and the left-side rim section due to rotation of the steering wheel, based on an amount of displacement of the steering angle detected by the steering angle detection sensor, and that corrects the component force detected by the load cells to eliminate an effect of the derived inertial force component.

20 Claims, 7 Drawing Sheets

DEVICE FOR DETECTING STEERING OPERATION FORCE

CROSS-REFERENCE TO RELATED APPLICATIONS

This application is based upon and claims the benefit of priority from Japanese Patent Application No. 2010-149765, filed Jun. 30, 2010, the entire contents of which are incorporated herein by reference.

BACKGROUND

1. Technical Field

The present technology relates to a device for detecting steering operation force that can detect steering operation force applied to a steering wheel.

2. Related Art

Conventionally, steering operation condition detecting devices for accurately detecting an operating input component of a driver, taking into consideration an empty weight of the steering wheel, have been suggested as devices for detecting steering operation force (e.g. Japanese Unexamined Patent Application Publication No. 2008-298430A).

However, when a driver operates a steering wheel, the steering wheel is rotated in a circumferential direction with the steering shaft as a center. At this point, inertial force acts on the rotating steering wheel. Inertial force includes inertial force that acts on an outer side in a radial direction of the rotating steering wheel (i.e. centrifugal force) and inertial force that acts in a reverse rotation direction of the rotating steering wheel. Here, when the inertial force described above acts on the steering wheel, detection of the steering operation force is affected because the inertial force acts on the steering operation force that is the target of the detection.

SUMMARY

The present technology provides a device for detecting steering operation force that can eliminate the effect produced when detecting steering operation force and more accurately detect steering operation force.

A device for detecting steering operation force of the present technology that can detect steering operation force of a steering wheel having a steering wheel rim includes an input detection device that can detect at least one component force of six component forces of the steering operation force acting on the steering wheel rim consisting of forces in three axial directions and moments about three axes; a steering angle detection device that can detect a steering angle of the steering wheel; and an inertial force component correcting device that can derive an inertial force component acting on the steering wheel rim due to rotation of the steering wheel, based on an amount of displacement of the steering angle detected by the steering angle detection device, and that can correct the component force detected by the input detection device so that an effect of the derived inertial force component is eliminated.

Here, a centrifugal force vector component acting on an outer side in a radial direction of the rotating steering wheel rim is preferably included as the inertial force component.

Here, an inertial force vector component acting in a reverse rotation direction of the rotating steering wheel rim is preferably included as the inertial force component.

Here, the device for detecting steering operation force preferably further includes a tilt angle detection device that can detect a tilt angle of the steering wheel; and a gravitational force component correcting device that can derive a gravitational force component acting on the steering wheel rim caused by an empty weight of the steering wheel rim, based on the steering angle detected by the steering angle detection device and the tilt angle detected by the tilt angle detection device, and that can correct the component force detected by the input detection device so that an effect of the derived gravitational force component is eliminated.

Here, the device for detecting steering operation force preferably further includes a force applied point detection device that is provided in the steering wheel rim and that can detect a force applied point gripped by an operator that is operating the steering wheel rim; and a force applied point correcting device that can transform the component force detected by the input detection device to coordinates of a coordinate system centered on the force applied point, based on detection results of the force applied point detection device.

According to the device for detecting steering operation force of the present technology, the effect of inertial force such as centrifugal force and the like acting on a steering wheel rim can be eliminated. Therefore, it is possible to more accurately detect steering operation force.

DETAILED DESCRIPTION

Figure 1:
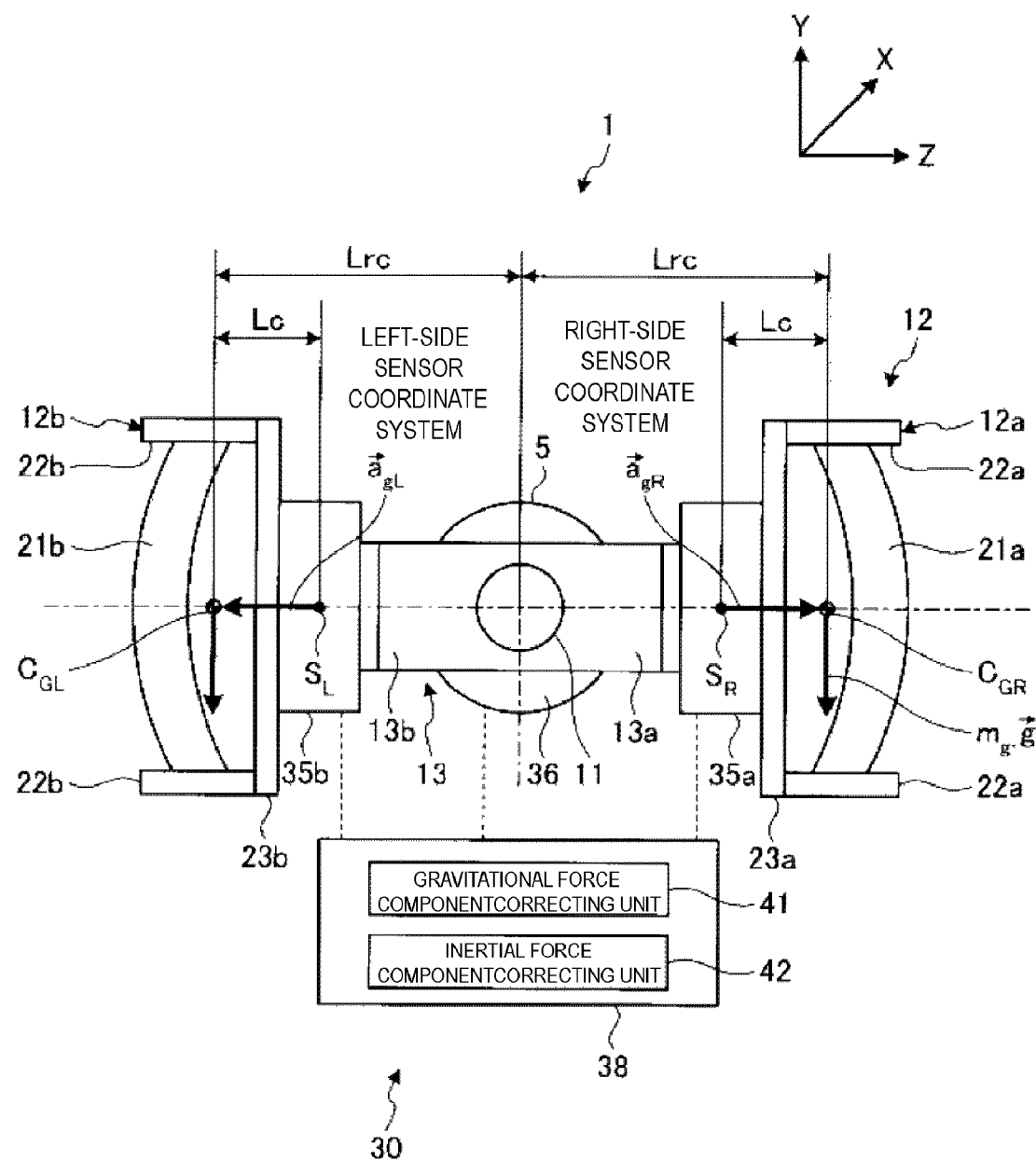
FIG. 1 is a front view schematically illustrating a steering wheel assembly to which a device for detecting steering operation force according to Working Example 1 is applied.

A device for detecting steering operation force of the present technology is described while referring to the drawings. However, the embodiments of the present technology explained below do not limit the present technology. Furthermore, the constituents of the working examples include constituents that can be easily replaced by those skilled in the art and constituents substantially same as the constituents of the working examples.

Working Example 1

A device for detecting steering operation force according to the following Working Example 1 detects steering operation force input to a steering wheel by a driver. Before describing the device for detecting steering operation force, the steering wheel to which the device for detecting steering operation force of Working Example 1 is applied will be described.

Figure 2:
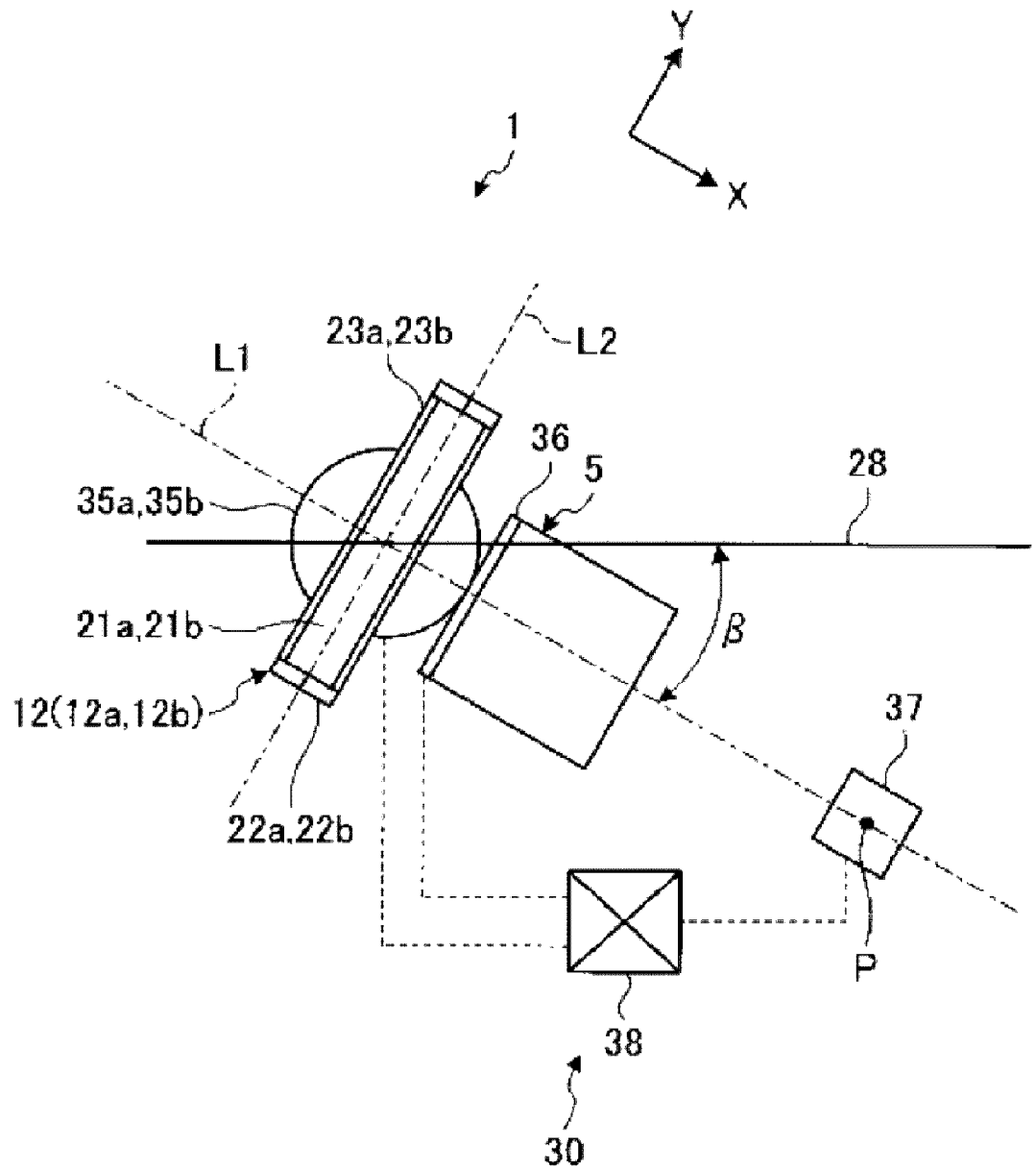
FIG. 2 is a side view schematically illustrating a steering wheel assembly to which a device for detecting steering operation force according to Working Example 1 is applied.
Figure 3:
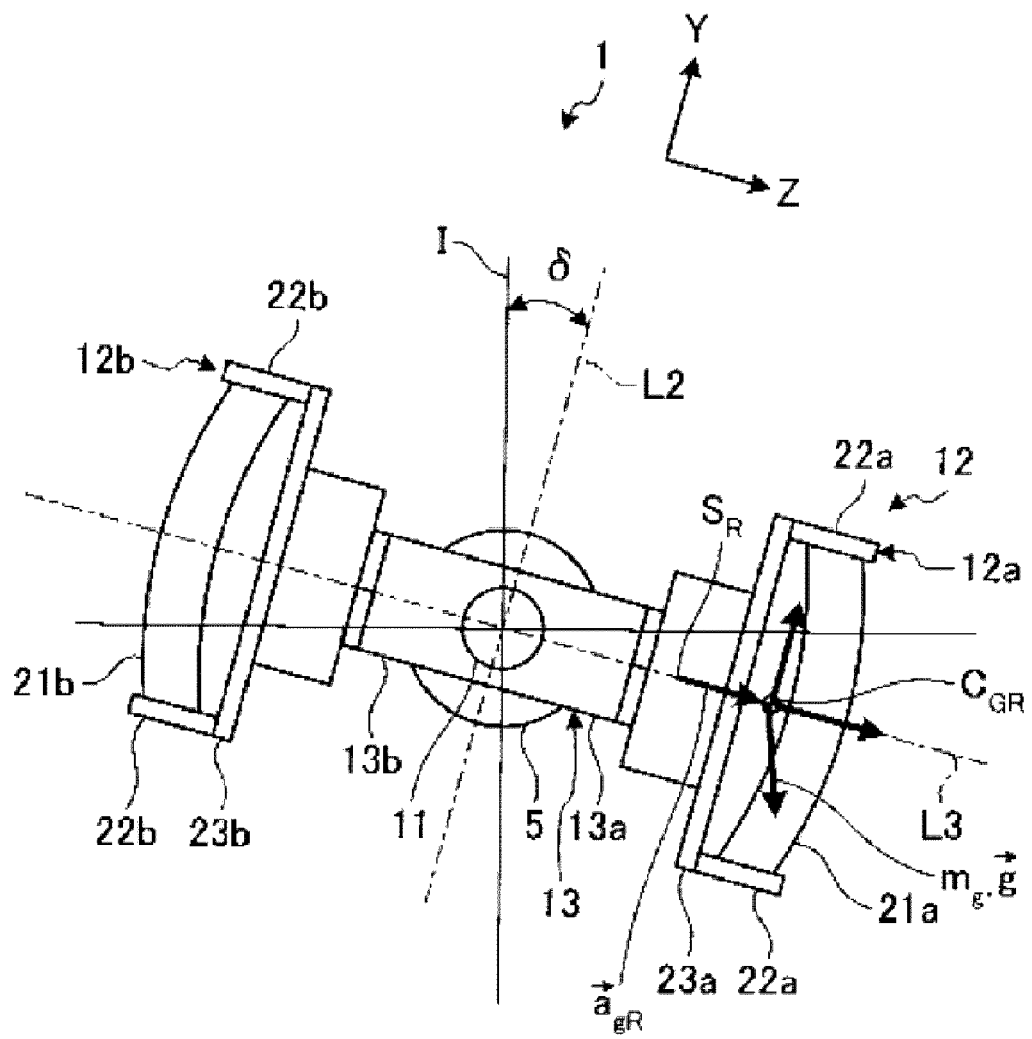
FIG. 3 is a front view of a steering wheel when rotated exactly a steering angle δ.

FIG. 1 is a front view schematically illustrating a steering wheel assembly to which a device for detecting steering operation force according to Working Example 1 is applied. FIG. 2 is a side view schematically illustrating a steering wheel assembly to which a device for detecting steering operation force according to Working Example 1 is applied. Additionally, FIG. 3 is a front view of a steering wheel when rotated at steering angle δ. As illustrated in FIG. 1, a steering wheel 1 is attached to a steering shaft 5 that is a rotational axis, and is rotatable in a circumferential direction having the steering shaft 5 as a center.

The steering wheel 1 includes a steering wheel hub 11 that can be fixed and coupled to the steering shaft 5, a steering wheel rim 12 provided around the steering wheel hub 11, and a steering wheel spoke 13 connecting the steering wheel hub 11 and the steering wheel rim 12.

The steering wheel rim 12 is divided into two left and right sections and has a right-side rim section 12a and a left-side rim section 12b. Moreover, the right-side rim section 12a and the left-side rim section 12b sandwich the steering wheel hub 11 and are provided at positions that are 180° in opposition. In other words, the right-side rim section 12a is provided on a side opposite the left-side rim section 12b so as to sandwich the steering wheel hub 11.

The right-side rim section 12a has a right-side grip 21a curving along the circumferential direction, a pair of right-side support plates 22a provided on both edge surfaces in a circumferential direction of the right-side grip 21a, and a right-side fixing plate 23a provided on an inner side of the pair of right-side support plates 22a in a radial direction. Moreover, the pair of right-side support plates 22a is disposed so as to protrude toward a surface of an outer side of the right-side fixing plate 23a in the radial direction at both edges of the right-side fixing plate 23a in a longitudinal direction. Thereby, the pair of right-side support plates 22a and the right-side fixing plate 23a are combined so as to form a recessed shape that is recessed toward an inner side in the radial direction. Additionally, the right-side grip 21a is provided between the pair of right-side support plates 22a, the right-side grip 21a becoming a gripping portion for the right hand of the driver when operating the steering wheel 1.

The left-side rim section 12b is configured the same as the right-side rim section 12a, and has a left-side grip 21b curving along the circumferential direction, a pair of left-side support plates 22b provided on both edge surfaces in a circumferential direction of the left-side grip 21b, and a left-side fixing plate 23b provided on an inner side of the pair of left-side support plates 22b in the radial direction.

The steering wheel spoke 13 has a right-side spoke 13a connecting the right-side rim section 12a and the steering wheel hub 11, and a left-side spoke 13b connecting the left-side rim section 12b and the steering wheel hub 11. The right-side spoke 13a and the left-side spoke 13b are formed so as to be integral. In other words, the steering wheel spoke 13 is provided so that the right-side rim section 12a and the left-side rim section 12b are connected with the steering wheel hub 11 as a center.

Here, a right-side load cell 35a is interposed between the right-side rim section 12a and the right-side spoke 13a, and a left-side load cell 35b is interposed between the left-side rim section 12b and the left-side spoke 13b. The right-side load cell 35a and the left-side load cell 35b constitute a portion of a device for detecting steering operation force 30.

As illustrated in FIG. 2, the steering wheel 1 is connected to a first edge (top edge) of the steering shaft 5. A steering angle detection sensor 36 that can detect a steering angle δ of the steering wheel 1 is interposed between the steering shaft 5 and the steering wheel 1. The steering angle detection sensor 36 constitutes a portion of the device for detecting steering operation force 30.

The steering shaft 5 is configured so as to be rotatable, with a tilt support point P as a center, on a bottom side in an axial direction. Thereby, a tilt angle β can be varied by rotating the steering shaft 5 having the tilt support point P as the center. Here, the tilt angle β is an angle formed by a horizontal plane 28 and the steering shaft 5. Moreover, a tilt angle detection sensor 37 that can detect the tilt angle β is provided around the tilt support point P. The tilt angle detection sensor 37 constitutes a portion of the device for detecting steering operation force 30.

Here, in FIG. 2, a line L1 extending in the axial direction of the steering shaft 5 is an axis line in the X-axis direction. In FIG. 3, a line L3 that joins a center of the right-side load cell 35a and a center of the left-side load cell 35b is an axis line in the Z-axis direction, and a line L2 that is orthogonal to the axis line L1 and the axis line L3 is an axis line in the Y-axis direction.

The device for detecting steering operation force 30 calculates a steering operation force of a sensor coordinate system centered on the right-side load cell 35a and the left-side load cell 35b. The sensor coordinate system is formed from a right-side sensor coordinate system centered on the right-side load cell 35a and a left-side sensor coordinate system centered on the left-side load cell 35b. The right-side sensor coordinate system is a three-dimensional Cartesian coordinate system centered on the right-side load cell 35a, and, likewise, the left-side sensor coordinate system is a three-dimensional Cartesian coordinate system centered on the left-side load cell 35b. Therefore, when the steering wheel 1 is rotated, the right-side load cell 35a and the left-side load cell 35b also rotate simultaneously and, thus, the axis line L2 of the Y-axis direction and the axis line L3 of the Z-axis direction rotate along with the steering wheel 1.

A line I passing through the center of the steering shaft 5 illustrated in FIG. 3 is a reference line of the steering angle δ, and an angle formed by this reference line I and the axis line L2 of the Y-axis direction is the steering angle δ. In other words, when the reference line I overlaps the axis line L2 of the Y-axis direction, a neutral state of the steering wheel 1 in which the vehicle is traveling straight is achieved, and the steering angle is 0°. On the other hand, when the steering wheel 1 is rotated to the right as illustrated (positive rotation), the vehicle turns right exactly an amount corresponding to the steering angle δ to which the steering wheel 1 was positively rotated.

Note that in FIG. 3, a distant direction of the space in the X-axis direction is a positive direction and a close direction of the space is a negative direction. Additionally, in the drawing, a top side in the Y-axis direction is the positive direction and a bottom side is the negative direction. Furthermore, an outer side in the radial direction of the Z-axis direction is the positive direction and an inner side in the radial direction is the negative direction. Additionally, with the steering angle δ, in the drawing, the right rotation direction is the positive direction and the left rotation direction is the negative direction. Moreover, in FIG. 2, with the tilt angle β, a direction where the steering wheel 1 is oriented upwardly is the positive direction and a direction where the steering wheel 1 is oriented downwardly is the negative direction.

When the driver grips the right-side grip 21a and the left-side grip 21b and positively rotates the steering wheel 1, the right-side rim section 12a and the left-side rim section 12b rotate, tracing a circular path centered on the steering shaft 5. Here, gravitational force acting on a bottom side in a vertical direction, a first inertial force (centrifugal force) acting on an outer side in the radial direction, and a second inertial force acting in the reverse rotation direction (left rotation rotating direction) are at work in the right-side rim section 12a and the left-side rim section 12b.

In this case, if an attempt is made to detect the steering operation force of the driver operating the steering wheel 1, it will be difficult to accurately detect the steering operation force due to the gravitational force, the first inertial force, and the second inertial force acting on the right-side rim section 12a and the left-side rim section 12b. Thus, with the device for detecting steering operation force 30 according to Working Example 1, effects of the gravitational force, the first inertial force, and the second inertial force acting on the right-side rim section 12a and the left-side rim section 12b are eliminated. Next, the device for detecting steering operation force 30 applied to the steering wheel 1 configured as described above will be described.

The device for detecting steering operation force 30 includes the pair of left and right load cells 35a and 35b described above, the steering angle detection sensor 36 described above, the tilt angle detection sensor 37, and a control device 38 that can execute a variety of computations based on results detected by each of the sensors.

The right-side load cell 35a is configured so as to be able to detect a force $F_{SR}$ of the X-axis direction, the Y-axis direction, and the Z-axis direction, and a moment $M_{SR}$ about the X-axis direction, the Y-axis direction, and the Z-axis direction. In other words, the right-side load cell 35a is a load cell that can measure six component forces. The left-side load cell 35b is configured the same as the right-side load cell 35a.

As illustrated in FIG. 1, in the device for detecting steering operation force 30, the steering operation force applied on the right-side of the steering wheel 1 in the drawing is detected by the right-side sensor coordinate system. Likewise, in the device for detecting steering operation force 30, the steering operation force applied on the left-side of the steering wheel 1 in the drawing is detected by the left-side sensor coordinate system. The center of the right-side load cell 35a is $S_R$, and the center of the left-side load cell 35b is $S_L$. Additionally, a center of gravity of the right-side rim section 12a is $C_{GR}$ and is positioned on the Z-axis. On the other hand, a center of gravity of the left-side rim section 12b is $C_{GL}$ and is positioned on the Z-axis. In Working Example 1, the center of gravity $C_{GR}$ of the right-side rim section 12a and the center of gravity $C_{GL}$ of the left-side rim section 12b are positioned on the Z-axis, but depending on the shape and the like of the right-side rim section 12a and the left-side rim section 12b, the positions of the centers of gravity $C_{GR}$ and $C_{GL}$ may be varied as desired. Additionally, a vector component from a center $S_R$ of the right-side load cell 35a to the center of gravity $C_{GR}$ of the right-side rim section 12a is $a_{gR}$, and a vector component from a center $S_L$ of the left-side load cell 35b to the center of gravity $C_{GL}$ of the left-side rim section 12b is $a_{gL}$.

The steering angle detection sensor 36 is, for example, a rotary encoder, and is configured so as to be able to detect the steering angle δ by detecting an amount of displacement of rotation of the steering wheel 1 with respect to the reference line I.

The tilt angle detection sensor 37 is also, for example, a rotary encoder, and is configured so as to be able to detect the tilt angle β by detecting an amount of displacement of the rotation of the steering shaft 5 with respect to the horizontal plane 28.

The control device 38 corrects the six component forces detected by the pair of left and right load cells 35a and 35b based on detection results of the steering angle detection sensor 36 and the tilt angle detection sensor 37. Here, for example, from the perspective of the right-side load cell 35a, when the steering wheel 1 rotates, gravitational force due to an empty weight of the right-side rim section 12a, the first inertial force on the outer side in the radial direction, and the second inertial force in the reverse rotation direction act on the center of gravity $C_{GR}$ of the right-side rim section 12a. Thus, the gravitational force, the first inertial force, and the second inertial force are input to the right-side load cell 35a.

In order to eliminate the gravitational force, the first inertial force, and the second inertial force described above, the control device 38 is provided with a gravitational force component correcting unit 41 that corrects an effect caused by the empty weight of the steering wheel rim 12 (gravitational force component correcting device) and an inertial force component correcting unit 42 that corrects an effect caused by the inertial force being applied to the steering wheel rim 12 (inertial force component correcting device). Note that the control device 38 is a so-called computer, and includes a CPU that performs computing, memory that is operating space, a storage device for storing various data and programs, and an I/O unit that connects thereto. These components work together to make performance of a variety of computations possible. The detection of the steering operation force at the right-side sensor coordinate system and the left-side sensor coordinate system are configured so as to be roughly the same. Therefore, hereinafter, a case where the steering operation force is detected at the right-side sensor coordinate system will be described.

The gravitational force component correcting unit 41 corrects the steering operation force detected by the right-side load cell 35a by eliminating the vector component of gravitational force (gravitational force component) acting on the center of gravity $C_{GR}$ of the right-side rim section 12a. Specifically, the steering operation force after correction is derived by subtracting the gravitational force component of the right-side rim section 12a from the steering operation force before correction (detection results of the right-side load cell 35a; Equations (5) and (6) below). Note that the gravitational force component correcting unit 41 can execute the same correction with regards to the left-side load cell 35b as well.

Figure 4:
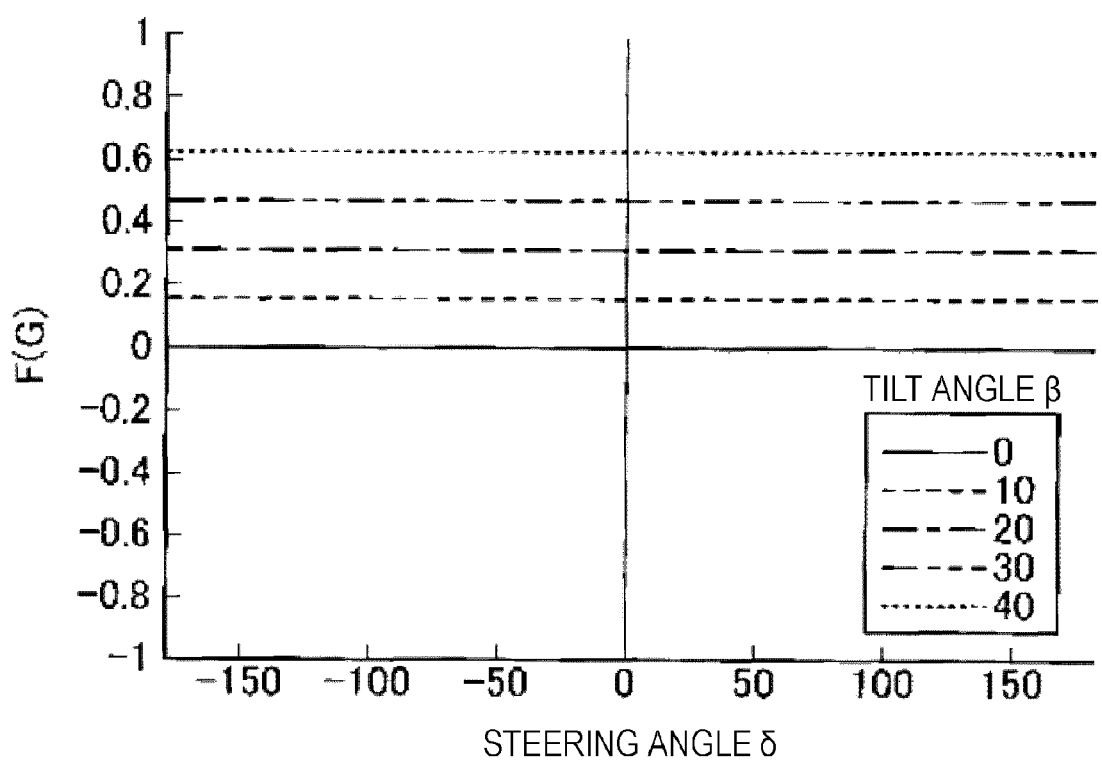
FIG. 4 is a graph wherein gravitational acceleration in an X-axis direction varies according to angles of a steering angle and a tilt angle.
Figure 5:
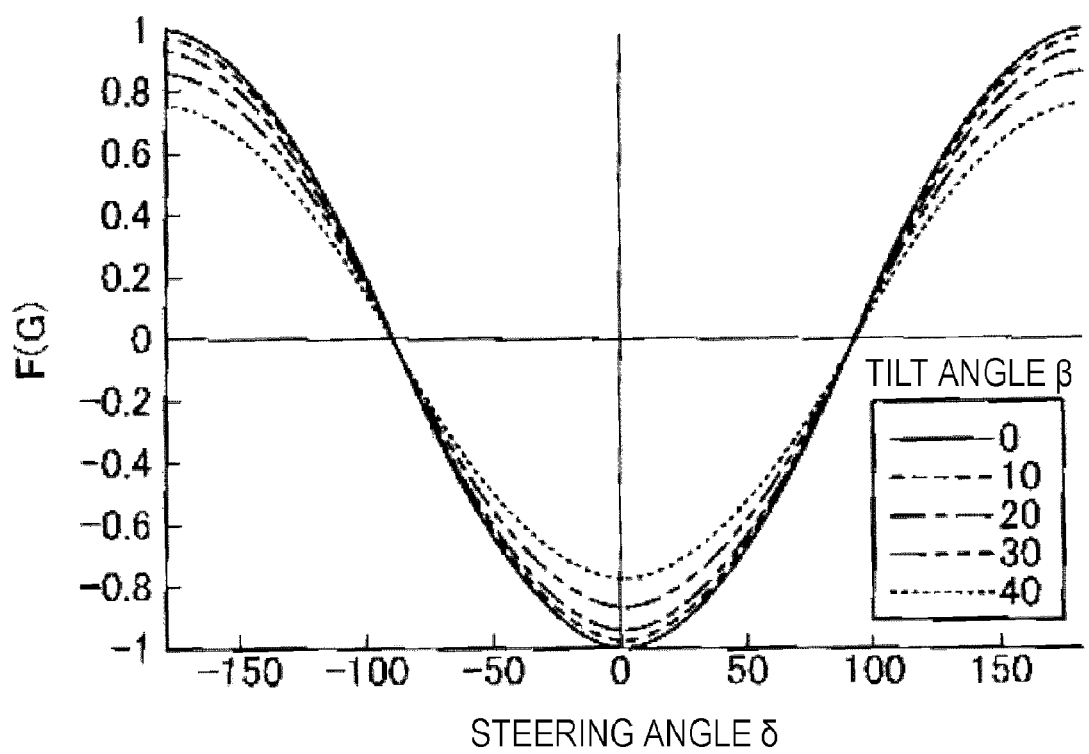
FIG. 5 is a graph wherein gravitational acceleration in a Y-axis direction varies according to the angles of the steering angle and the tilt angle.
Figure 6:
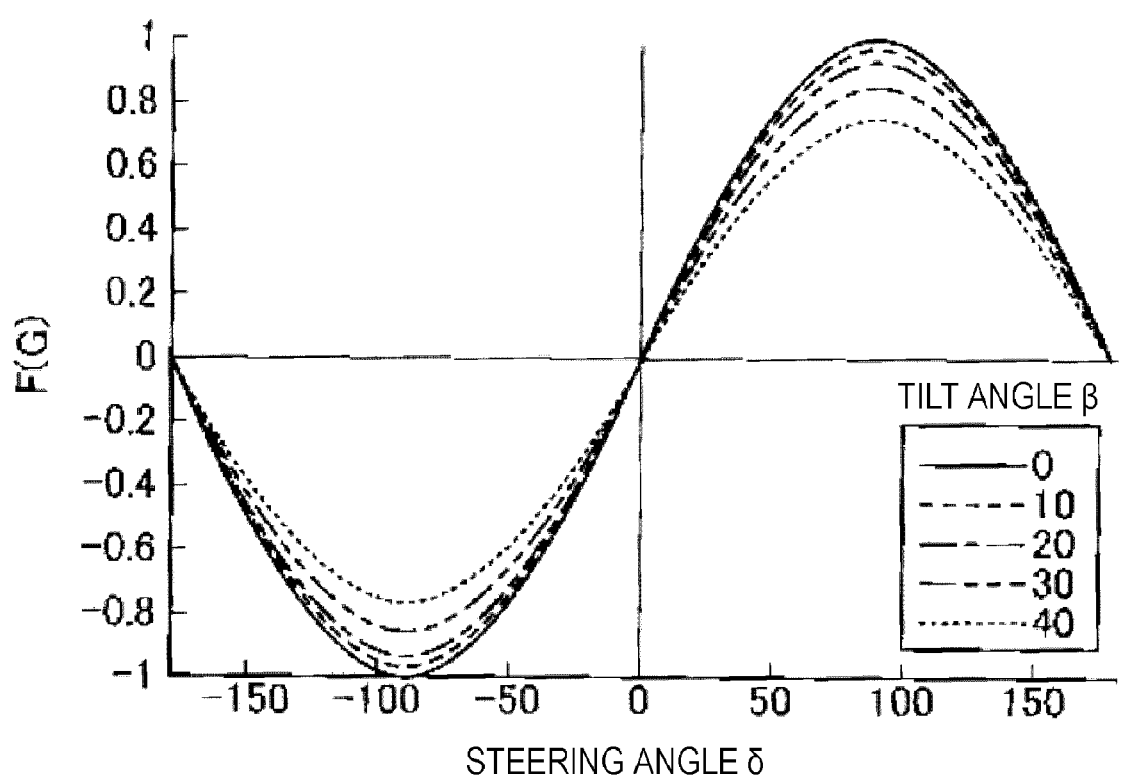
FIG. 6 is a graph wherein gravitational acceleration in a Z-axis direction varies according to the angles of the steering angle and the tilt angle.

FIG. 4 is a graph wherein gravitational acceleration in the X-axis direction varies according to angles of the steering angle and the tilt angle. FIG. 5 is a graph wherein gravitational acceleration in the Y-axis direction varies according to the angles of the steering angle and the tilt angle. FIG. 6 is a graph wherein gravitational acceleration in the Z-axis direction varies according to the angles of the steering angle and the tilt angle. The gravitational force component is calculated by multiplying the vector component of the gravitational acceleration by a mass $m_g$ of the right-side rim section 12a. In FIGS. 4 to 6, the steering angle δ is shown on the horizontal axis and the vector component of gravitational acceleration with a size of 1 is shown on the vertical axis. Additionally, a plurality of vector components of gravitational acceleration is derived based on differing angles of the tilt angle β. Note that the vector component of gravitational acceleration with a size of 1 is expressed in Equation (1).

$$|\vec{g}|=1 \qquad (1)$$

As shown in FIGS. 4 to 6, with the vector component of gravitational acceleration acting on the right-side load cell 35a, gravitational acceleration in the X-axis direction, gravitational acceleration in the Y-axis direction, and gravitational acceleration in the Z-axis direction vary based on the steering angle δ and the tilt angle β. Therefore, when broken down to the three axial directions of the X-axis direction, the Y-axis direction, and the Z-axis direction, the vector component of gravitational acceleration acting on the right-side load cell 35a is expressed by Equation (2), as follows.

$$\vec{g} = \begin{bmatrix} \sin\beta \\ -\cos\beta \cdot \cos\delta \\ \cos\beta \cdot \sin\delta \end{bmatrix} \quad (2)$$

As shown in FIG. 4 and in Equation (2), the gravitational acceleration in the X-axis direction acting on the right-side load cell 35a is dependent on the tilt angle β. Therefore, the gravitational acceleration in the X-axis direction is 0 when the tilt angle β is 0°, is greatest when the tilt angle β is 90° (reaches 1), and varies along with the graph of sin β. On the other hand, the gravitational acceleration in the X-axis direction is not dependent on the steering angle δ and, therefore, even if the steering angle δ varies, the gravitational acceleration in the X-axis direction does not vary. Thus, as shown in Equation (2), the gravitational acceleration $g_x$ in the X-axis direction is expressed $g_x = \sin\beta$.

As shown in FIG. 5 and in Equation (2), the gravitational acceleration in the Y-axis direction acting on the right-side load cell 35a is dependent on the steering angle δ and the tilt angle β. Therefore, the gravitational acceleration in the Y-axis direction is greatest in the negative direction when the steering angle δ is 0°, is 0 when the steering angle δ is ±90°, and varies along with the graph of −cos δ. Additionally, a difference between a local maximum value and a local minimum value of the gravitational acceleration in the Y-axis direction is greatest when the tilt angle β is 0°, the difference between the local maximum value and the local minimum value is 0 when the tilt angle β is 90°, and varies along with the graph of cos β. In other words, the gravitational acceleration in the Y-axis direction is greatest when the steering wheel 1 is in a neutral state, and the gravitational acceleration in the Y-axis direction declines as the gravitational acceleration in the X-axis direction increases. Thus, as shown in Equation (2), the gravitational acceleration $g_y$ in the Y-axis direction is expressed $g_y = -\cos\beta \cdot \cos\delta$.

As shown in FIG. 6 and in Equation (2), the gravitational acceleration in the Z-axis direction acting on the right-side load cell 35a is dependent on the steering angle δ and the tilt angle β. Therefore, the gravitational acceleration in the Z-axis direction is greatest in the positive direction when the steering angle δ is 90°, is 0 when the steering angle δ is 0°, and varies along with the graph of sin δ. Additionally, a difference between a local maximum value and a local minimum value of the gravitational acceleration in the Z-axis direction is greatest when the tilt angle β is 0°, the difference between the local maximum value and the local minimum value is 0 when the tilt angle β is 90°, and varies along with the graph of cos β. In other words, the gravitational acceleration in the Z-axis direction is greatest when the steering angle δ of the steering wheel 1 is ±90°, and the gravitational acceleration in the Z-axis direction declines as the gravitational acceleration in the X-axis direction increases. Thus, as shown in Equation (2), the gravitational acceleration $g_z$ in the Z-axis direction is expressed $g_z = \cos\beta \cdot \sin\delta$.

A length from the center $S_R$ of the right-side load cell 35a to the center of gravity $C_{GR}$ of the right-side rim section 12a is Lc, and a length from the center $S_L$ of the left-side load cell 35b to the center of gravity $C_{GL}$ of the left-side rim section 12b is Lc. Moreover, because the center $S_R$ of the right-side load cell 35a is on the Z-axis and the center of gravity $C_{GR}$ of the right-side rim section 12a is on the Z-axis, the vector component $a_{gR}$ is expressed by Equation (3). Likewise, because the center $S_L$ of the left-side load cell 35b is on the Z-axis and the center of gravity $C_{GL}$ of the left-side rim section 12b is on the Z-axis, the vector component $a_{GL}$ is expressed by Equation (4).

$$\vec{a}_{gR} = \begin{bmatrix} 0 \\ 0 \\ Lc \end{bmatrix} \quad (3)$$

$$\vec{a}_{gL} = \begin{bmatrix} 0 \\ 0 \\ -Lc \end{bmatrix} \quad (4)$$

As described above, the gravitational force component of the right-side rim section 12a of the six component forces related to the steering operation force after correction is eliminated from the detection results of the right-side load cell 35a, but here, by taking the variation of the gravitational acceleration in the three axial directions into account as described above, Equations (5) and (6) are obtained.

$$F_{SR1} = F_{SR} - m_g \cdot \vec{g} \quad (5)$$
$$= \begin{bmatrix} f_{SRx} \\ f_{SRy} \\ f_{SRz} \end{bmatrix} - \begin{bmatrix} m_g \cdot \sin\beta \\ -m_g \cdot \cos\beta \cdot \cos\delta \\ m_g \cdot \cos\beta \cdot \sin\delta \end{bmatrix} \begin{bmatrix} f_{SRx} - m_g \cdot \sin\beta \\ f_{SRy} + m_g \cdot \cos\beta \cdot \cos\delta \\ f_{SRz} - m_g \cdot \cos\beta \cdot \sin\delta \end{bmatrix}$$

$$M_{SR1} = M_{SR} - \vec{a_{gR}} \times (m_g \cdot \vec{g}) \quad (6)$$
$$= \begin{bmatrix} m_{SRx} \\ m_{SRy} \\ m_{SRz} \end{bmatrix} - \begin{bmatrix} a_{gRx} \\ a_{gRy} \\ a_{gRz} \end{bmatrix} \times \begin{bmatrix} m_g \cdot \sin\beta \\ -m_g \cdot \cos\beta \cdot \cos\delta \\ m_g \cdot \cos\beta \cdot \sin\delta \end{bmatrix}$$

In Equation (5), a force $F_{SR1}$ after correction is derived by subtracting the gravitational force component acting on the right-side rim section 12a from the force $F_{SR}$ detected by the right-side load cell 35a. Specifically, the force $F_{SR}$ is broken down into a force $F_{SRx}$ in the X-axis direction, a force $F_{SRy}$ in the Y-axis direction, and a force $F_{SRz}$ in the Z-axis direction, and Equation (5) is obtained by subtracting the gravitational force component in the X-axis direction, the gravitational force component in the Y-axis direction, and the gravitational force component in the Z-axis direction of the right-side rim section 12a from each of the components individually.

Additionally, in Equation (6), a moment $M_{SR1}$ after correction is derived by subtracting a moment caused by gravitational force from a moment $M_{SR}$ detected by the right-side load cell 35a. Note that the moment $M_{SR}$ detected by the right-side load cell 35a is obtained via a cross product of the vector component $a_{gR}$ and the force $F_{SR}$, and the moment caused by gravitational force is obtained via a cross product of the vector component $a_{gR}$ and the gravitational force component. Specifically, the moment $M_{SR}$ is broken down into a moment $M_{SRx}$ about the X-axis direction, a moment $M_{SRy}$ about the Y-axis direction, and a moment $M_{SRz}$ about the Z-axis direction, and Equation (6) is obtained by subtracting the moment caused by the gravitational force in the X-axis direction, the moment caused by the gravitational force in the Y-axis direction, and the moment caused by the gravitational force in the Z-axis direction from each of the components individually. By solving Equation (6), each of the moments about the three axial directions of the moment $M_{SR1}$ after correction can be derived.

Thus, by substituting the detection results detected by the right-side load cell 35a, the steering angle detection sensor 36, and the tilt angle detection sensor 37 in Equation (5), the gravitational force component correcting unit 41 can perform correction of the gravitational force component with respect to the forces of the three axial directions detected by the right-side load cell 35a. Likewise, by substituting the detection results detected by the right-side load cell 35a, the steering angle detection sensor 36, and the tilt angle detection sensor 37 in Equation (6), the gravitational force component correcting unit 41 can perform correction of the gravitational force component with respect to the moments about the three axial directions detected by the right-side load cell 35a. Note that while the right-side sensor coordinate system was exclusively referred to above, the left-side sensor coordinate system is identical and, for this reason, description has been omitted.

Next, the inertial force component correcting unit 42 will be described, but in order to simplify description, a case in which correction is performed only by the inertial force component correcting unit 42, without correction by the gravitational force component correcting unit 41 will be described. Note that in this case as well, only a description of the right-side sensor coordinate system will be given. The inertial force component correcting unit 42 corrects the steering operation force by eliminating each of a vector component of the first inertial force (first inertial force component; centrifugal force) acting on the outer side in the radial direction of a center of gravity $C_{GR}$ of the right-side rim section 12a, and a vector component of the second inertial force (second inertial force component) acting in the reverse rotation direction of the center of gravity $C_{GR}$ of the right-side rim section 12a. Specifically, the steering operation force after correction is derived by subtracting the first inertial force component and the second inertial force component of the right-side rim section 12a from the steering operation force before correction (the detection results of the right-side load cell 35a; Equations (7) and (8) below). Note that the inertial force component correcting unit 42 can execute the same correction with regards to the left-side load cell 35b as well.

Here, the first inertial force or, rather, the centrifugal force is calculated by multiplying a radius Lrc from the center of the steering shaft 5 to the center of gravity $C_{GR}$ of the right-side rim section 12a, a square of an angular velocity of the steering angle δ, and the mass of the right-side rim section 12a. The first inertial force component is calculated by multiplying the centrifugal force by a unit vector component in the Z-axis direction. Additionally, the second inertial force is calculated by multiplying the radius Lrc, the angular velocity of the steering angle δ, and the mass of the right-side rim section 12a. The second inertial force component is calculated by multiplying the second inertial force by a unit vector component in the Y-axis direction.

As described in detail below, the first inertial force component and the second inertial force component of the six component forces related to the steering operation force after correction are eliminated from the detection results of the right-side load cell 35a and, thereby, Equations (7) and (8) are obtained.

$\dot{\delta}$: STEERING ANGLE VELOCITY
$\ddot{\delta}$: STEERING ANGLE ACCELERATION $$F_{SR1} = F_{SR} - \underbrace{(Lrc)\dot{\delta}^2 \cdot m_g \cdot \frac{\vec{a}_{gR}}{|\vec{a}_{gR}|}}_{\text{FIRST INERTIAL FORCE (CENTRIFUGAL FORCE)}} - \underbrace{(Lrc)\ddot{\delta} \cdot m_g \cdot \begin{bmatrix} 0 \\ 1 \\ 0 \end{bmatrix}}_{\text{SECOND INERTIAL FORCE}} \quad (7)$$

$$= \begin{bmatrix} f_{SRx} \\ f_{SRy} - (Lrc)\ddot{\delta} \cdot m_g \\ f_{SRz} - (Lrc)\dot{\delta}^2 \cdot m_g \end{bmatrix}$$

$$M_{SR1} = M_{SR} - \vec{a}_{gR} \times \underbrace{\left( (Lrc)\ddot{\delta} \cdot m_g \cdot \begin{bmatrix} 0 \\ 1 \\ 0 \end{bmatrix} \right)}_{\text{MOMENT CAUSED BY SECOND INERTIAL FORCE}} \quad (8)$$

$$= \begin{bmatrix} m_{SRx} \\ m_{SRy} \\ m_{SRz} \end{bmatrix} - \begin{bmatrix} a_{gRx} \\ a_{gRy} \\ a_{gRz} \end{bmatrix} \times \begin{bmatrix} 0 \\ Lrc \cdot \ddot{\delta} \cdot m_g \\ 0 \end{bmatrix}$$

$$= \begin{bmatrix} m_{SRx} + Lrc \cdot \ddot{\delta} \cdot m_g \cdot a_{gRz} \\ m_{SRy} \\ m_{SRz} - Lrc \cdot \ddot{\delta} \cdot m_g \cdot a_{gRx} \end{bmatrix}$$

In Equation (7), the force $F_{SR1}$ after correction is derived by subtracting the first inertial force component acting on the right-side rim section 12a and the second inertial force component acting on the right-side rim section 12a from the force $F_{SR}$ detected by the right-side load cell 35a. Specifically, the force $F_{SR}$ is broken down into the force $F_{SRx}$ in the X-axis direction, the force $F_{SRy}$ in the Y-axis direction, and the force $F_{SRz}$ in the Z-axis direction. Equation (7) is obtained by subtracting the first inertial force component in the X-axis direction, the first inertial force component in the Y-axis direction, and the first inertial force component in the Z-axis direction at the right-side rim section 12a from each of the components individually; and by subtracting the second inertial force component in the X-axis direction, the second inertial force component in the Y-axis direction, and the second inertial force component in the Z-axis direction at the right-side rim section 12a. Note that as is clear from Equation (7), the first inertial force component acts only in the Z-axis direction and the second inertial force component acts only in the Y-axis direction.

Additionally, in Equation (8), a moment $M_{SR1}$ after correction is derived by subtracting a moment caused by the first inertial force and the second inertial force from a moment $M_{SR}$ detected by the right-side load cell 35a. Note that the moment caused by the first inertial force is obtained via a cross product of the vector component $a_{gR}$ and the first inertial force component, and the moment caused by the second inertial force is obtained via a cross product of the vector component $a_{gR}$ and the second inertial force component. Here, because the first inertial force component is the Z-axis direction and the vector component $a_{gR}$ is also the Z-axis direction, the cross product of these is 0. Specifically, the moment $M_{SR}$ is broken down into a moment $M_{SRx}$ about the X-axis direction, a moment $M_{SRy}$ about the Y-axis direction, and a moment $M_{SRz}$ about the Z-axis direction. Equation (8) is obtained by subtracting the moment caused by the second inertial force in the X-axis direction, the moment caused by the second inertial force in the Y-axis direction, and the moment caused by the second inertial force in the Z-axis direction from each of the components individually.

Thus, by substituting the detection results detected by the right-side load cell 35a, the steering angle detection sensor 36, and the tilt angle detection sensor 37 in Equation (7), the inertial force component correcting unit 42 can perform correction of the first inertial force component and the second inertial force component with respect to the forces of the three axial directions detected by the right-side load cell 35a. Likewise, by substituting the detection results detected by the right-side load cell 35a, the steering angle detection sensor 36, and the tilt angle detection sensor 37 in Equation (8), the inertial force component correcting unit 42 can perform correction of the first inertial force component and the second inertial force component with respect to the moments about the three axial directions detected by the right-side load cell 35a. Note that while the right-side sensor coordinate system was exclusively referred to above, the left-side sensor coordinate system is identical and, for this reason, description has been omitted.

Additionally, in the description above, a case was described where the correction of the gravitational force component correcting unit 41 and the correction of the inertial force component correcting unit 42 were executed individually, but the inertial force component correction may be performed after the gravitational force component correction or, conversely, the gravitational force component correction may be performed after the inertial force component correction. In other words, the control device 38 can execute both the correction by the gravitational force component correcting unit 41 and the correction by the inertial force component correcting unit 42.

According to the configuration described above, the device for detecting steering operation force 30 can eliminate the effects of the first inertial force component and the second inertial force component acting on each of the right-side rim section 12a and the left-side rim section 12b by means of the inertial force component correcting unit 42. Therefore, the device for detecting steering operation force 30 can eliminate an effect produced when detecting steering operation force, which leads to being able to more accurately detect steering operation force.

Additionally, the device for detecting steering operation force 30 can eliminate the effects of the gravitational force component acting on each of the right-side rim section 12a and the left-side rim section 12b by means of the gravitational force component correcting unit 41. Therefore, the device for detecting steering operation force 30 can eliminate the effect produced when detection steering operation force, which leads to being able to more accurately detect steering operation force.

Working Example 2

Figure 7:
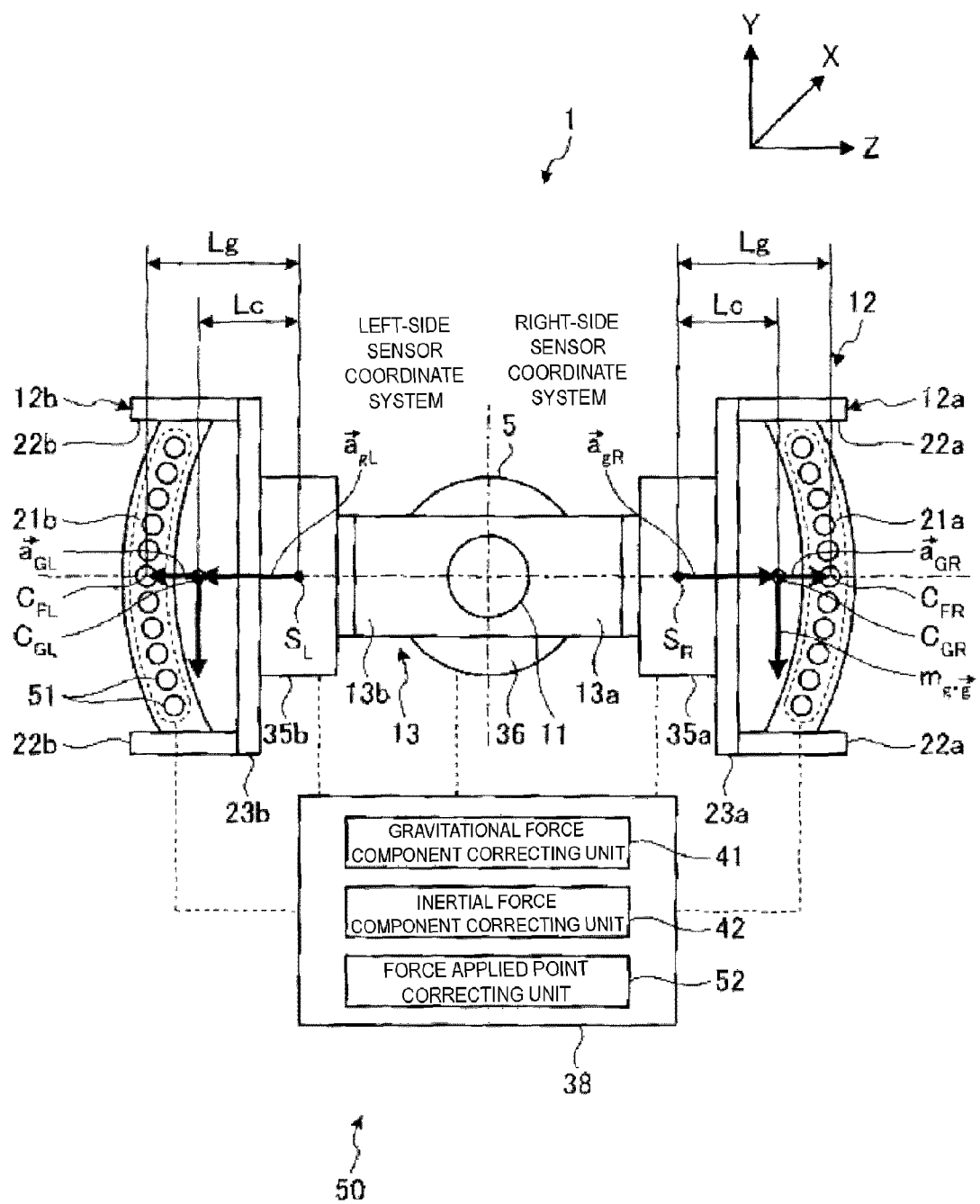
FIG. 7 is a front view schematically illustrating a steering wheel assembly to which a device for detecting steering operation force according to Working Example 2 is applied.

Next, a device for detecting steering operation force 50 according to Working Example 2 is described while referring to FIG. 7. FIG. 7 is a front view schematically illustrating a steering wheel assembly to which a device for detecting steering operation force according to Working Example 2 is applied. Note that in order to avoid redundant description, only differing constituents will be described. In addition to the device for detecting steering operation force 30 in the configuration of Working Example 1, the device for detecting steering operation force 50 of Working Example 2 also includes a force applied point detection sensor 51 that can detect a force applied point gripped by a driver. The control device 38 can correct the six component forces detected by each of the load cells 35a and 35b based on detection results of the force applied point detection sensor 51.

As described below in detail, a plurality of force applied point detection sensors 51 that can detect the force applied point is provided in the right-side grip 21a of the right-side rim section 12a and the left-side grip 21b of the left-side rim section 12b of the steering wheel rim 12, along the circumferential direction of each of the grips 21a and 21b. The plurality of force applied point detection sensors 51 is provided with equal spacing along the circumferential direction. Moreover, the plurality of force applied point detection sensors 51 is connected to the control device 38, and the control device 38 can identify the force applied point on each of the grips 21a and 21b based on the detection results of the plurality of force applied point detection sensors 51.

Additionally, the control device 38 further includes a force applied point correcting unit 52 that can transform a sensor coordinate system centered on each of the load cells 35a and 35b into a grip coordinate system centered on the force applied point based on the detection results of the plurality of force applied point detection sensors 51. The grip coordinate system is constituted by a right-side grip coordinate system that is a three-dimensional Cartesian coordinate system centered on the right-side grip 21a and a left-side grip coordinate system that is a three-dimensional Cartesian coordinate system centered on the left-side grip 21b. Next, a case in which the right-side sensor coordinate system is transformed to a right-side grip coordinate system will be described. Additionally, in order to simplify description, a case in which only correction by the force applied point correcting unit 52 is performed will be described.

The force applied point of the right-side grip 21a is $C_{FR}$, and the force applied point of the left-side grip 21b is $C_{FL}$. Note that the force applied points $C_{FR}$ and $C_{FL}$ can be modified as desired based on a gripping position of the driver. Additionally, a length from the center $S_R$ of the right-side load cell 35a to the force applied point $C_{FR}$ of the right-side grip 21a is Lg. Moreover, because the center $S_R$ of the right-side load cell 35a is on the Z-axis and the force applied point $C_{FR}$ of the of the right-side grip 21a is on the Z-axis, the vector component $a_{GR}$ from the center $S_R$ of the right-side load cell 35a to the force applied point $C_{FR}$ of the right-side grip 21a is expressed by Equation (9). Likewise, the vector component $a_{GL}$ from the center $S_L$ of the left-side load cell 35b to the force applied point $C_{FL}$ of the left-side grip 21b is expressed by Equation (10).

$$\vec{a}_{GR} = \begin{bmatrix} 0 \\ 0 \\ Lg \end{bmatrix} \quad (9)$$

$$\vec{a}_{GL} = \begin{bmatrix} 0 \\ 0 \\ -Lg \end{bmatrix} \quad (10)$$

As described in detail below, Equations (11) and (12) are obtained by correcting the six component forces related to the steering operation force after correction while taking into account the vector component $a_{GR}$.

$$F_{GR} = \begin{bmatrix} f_{GRx} \\ f_{GRy} \\ f_{GRz} \end{bmatrix} = F_{SR} = \begin{bmatrix} f_{SRx} \\ f_{SRy} \\ f_{SRz} \end{bmatrix} \quad (11)$$

-continued $$M_{GR} = \begin{bmatrix} m_{GRx} \\ m_{GRy} \\ m_{GRz} \end{bmatrix} \quad (12)$$

$$= M_{SR} - \vec{a}_{GR} \times F_{SR}$$

$$= \begin{bmatrix} m_{SRx} \\ m_{SRy} \\ m_{SRz} \end{bmatrix} - \begin{bmatrix} 0 \\ 0 \\ Lg \end{bmatrix} \times \begin{bmatrix} f_{SRx} \\ f_{SRy} \\ f_{SRz} \end{bmatrix}$$

Specifically, in Equation (11), the force $F_{SR}$ detected by the right-side load cell 35a is the right-side sensor coordinate system centered on the right-side load cell 35a, but in order to transform the force $F_{SR}$ into a right-side grip coordinate system centered on the force applied point, the force $F_{SR}$ is translated as-is to the force applied point $C_{FR}$. In other words, because a vector direction and size of the force $F_{SR}$ does not change, the force $F_{GR}$ at the force applied point $C_{FR}$ is the same as the force $F_{SR}$ detected by the right-side load cell 35a.

Additionally, in Equation (12), the moment $M_{SR}$ detected by the right-side load cell 35a is the right-side sensor coordinate system centered on the right-side load cell 35a, but in order to transform the moment $M_{SR}$ into a right-side grip coordinate system centered on the force applied point $C_{FR}$, a moment $M_{GR}$ of the right-side grip coordinate system is derived by finding a cross product of a vector component from the force applied point $C_{FR}$ of the right-side grip 21a to the center of gravity $C_{GR}$ of the right-side rim section 12a ($a_{SR}$-$a_{GR}$) and the force $F_{SR}$.

Thus, by substituting the detection results detected by the right-side load cell 35a and the force applied point detection sensor 51 in Equation (11), the force applied point correcting unit 52 can transform the forces of the three axial directions detected by the right-side load cell 35a from a right-side sensor coordinate system into a right-side grip coordinate system. Likewise, by substituting the detection results detected by the right-side load cell 35a and the force applied point detection sensor 51 in Equation (12), the force applied point correcting unit 52 can transform the moments about the three axial directions detected by the right-side load cell 35a from a right-side sensor coordinate system into a right-side grip coordinate system. Note that while the right-side sensor coordinate system was exclusively referred to above, the left-side sensor coordinate system is identical and, for this reason, description has been omitted.

Additionally, in the description above, a case was described where only the correction by the force applied point correcting unit 52 was executed, but the force applied point correction may be performed after the gravitational force component correction and the inertial force component correction. In other words, the control device 38 can execute all of the corrections by the force applied point correcting unit 52, the gravitational force component correcting unit 41, and the inertial force component correcting unit 42.

According to the configuration described above, the device for detecting steering operation force 30 can transform the steering operation forces detected by the right-side load cell 35a and the left-side load cell 35b from sensor coordinate systems centered on the load cells 35a and 35b into grip coordinate systems centered on the force applied points $C_{FR}$ and $C_{FL}$. Therefore, the steering operation force of the driver operating the steering wheel 1 can be detected at the force applied points $C_{FR}$ and $C_{FL}$ of each of the grips 21a and 21b.

Note that while the first inertial force component and the second inertial force component were corrected by the inertial force component correcting unit 42 in the device for detecting steering operation forces 30 and 50 of Working Example 1 and Working Example 2, a configuration in which either of the inertial force components is corrected is also possible. In other words, while only the right-side sensor coordinate system is mentioned, the forces of the three axial directions detected by the right-side load cell 35a may be corrected for the first inertial force component using Equation (13) wherein the second inertial force component clause of Equation (7) is removed. Note that the moments about the three axial directions detected by the right-side load cell 35a, as expressed in Equation (8), do not require correction as a cross product of the same axial directions is 0.

$$F_{SR1} = F_{SR} - \underbrace{(Lrc)\delta \cdot m_g \cdot \frac{\vec{a}_{gR}}{|\vec{a}_{gR}|}}_{\text{FIRST INERTIAL FORCE (CENTRIFUGAL FORCE)}} = \begin{bmatrix} f_{SRx} \\ f_{SRy} \\ f_{SRz} - (Lrc)\delta \cdot m_g \end{bmatrix} \quad (13)$$

Additionally, the moments about the three axial directions detected by the right-side load cell 35a may be corrected for the second inertial force component by using Equation (14) and Equation (15) wherein the first inertial force component clause of Equation (7) has been removed.

$$F_{SR1} = F_{SR} - \underbrace{(Lrc)\delta \cdot m_g \cdot \begin{bmatrix} 0 \\ 1 \\ 0 \end{bmatrix}}_{\text{SECOND INERTIAL FORCE}} = \begin{bmatrix} f_{SRx} \\ f_{SRy} - (Lrc)\delta \cdot m_g \\ f_{SRz} \end{bmatrix} \quad (14)$$

$$M_{SR1} = M_{SR} - \vec{a}_{gR} \times \underbrace{\left((Lrc)\delta \cdot m_g \cdot \begin{bmatrix} 0 \\ 1 \\ 0 \end{bmatrix}\right)}_{\text{MOMENT CAUSED BY SECOND INERTIAL FORCE}} \quad (15)$$

$$= \begin{bmatrix} m_{SRx} \\ m_{SRy} \\ m_{SRz} \end{bmatrix} - \begin{bmatrix} a_{gRx} \\ a_{gRy} \\ a_{gRz} \end{bmatrix} \times \begin{bmatrix} 0 \\ Lrc \cdot \delta \cdot m_g \\ 0 \end{bmatrix}$$

$$= \begin{bmatrix} m_{SRx} + Lrc \cdot \delta \cdot m_g \cdot a_{gRz} \\ m_{SRy} \\ m_{SRz} - Lrc \cdot \delta \cdot m_g \cdot a_{gRx} \end{bmatrix}$$

Additionally, in Working Example 1 and Working Example 2, a case where the steering wheel rim 12 was divided into two sides was described, but the steering wheel rim 12 is not limited to bisecting and may be divided into a plurality of sections. In such cases, the devices for detecting steering operation force 30 and 50 preferably are configured so that a plurality of load cells based on the number of sections is disposed, and the steering operation force input into each of the load cells can be detected.

Moreover, in Working Example 1 and Working Example 2 the right-side load cell 35a and the left-side load cell 35b were provided in the right-side rim section 12a and the left-side rim section 12b, respectively, but a load cell may be provided in only one side and detect the steering operation force of only one side.

As described above, the device for detecting steering operation force according to the present technology is useful in cases of detecting steering operation force applied to a steering wheel having a steering wheel rim divided into a plurality of sections, and is particularly suited for cases when inertial force acts on the steering wheel.

What is claimed is:

1. A device for detecting steering operation force that can detect steering operation force of a steering wheel comprising a steering wheel rim, comprising:
an input detection device configured to detect at least one component force of six component forces of the steering operation force acting on the steering wheel rim consisting of forces in three axial directions and moments about three axes;
a steering angle detection device configured to detect a steering angle of the steering wheel; and
an inertial force component correcting device configured to derive an inertial force component acting on the steering wheel rim due to rotation of the steering wheel, based on an amount of displacement of the steering angle detected by the steering angle detection device, and to correct the component force detected by the input detection device so that an effect of the derived inertial force component is eliminated.

2. The device for detecting steering operation force according to claim 1, wherein a centrifugal force vector component acts on an outer side in a radial direction of the rotating steering wheel rim as the inertial force component.

3. The device for detecting steering operation force according to claim 1, wherein an inertial force vector component acts in a reverse rotation direction of the rotating steering wheel rim as the inertial force component.

4. The device for detecting steering operation force according to claim 1, further comprising:
a tilt angle detection device configured to detect a tilt angle of the steering wheel.

5. The device for detecting steering operation force according to claim 4, further comprising a gravitational force component correcting device configured to derive a gravitational force component acting on the steering wheel rim caused by an empty weight of the steering wheel rim, based on the steering angle detected by the steering angle detection device and the tilt angle detected by the tilt angle detection device, and that can correct the component force detected by the input detection device so that an effect of the derived gravitational force component is eliminated.

6. The device for detecting steering operation force according to claim 1, further comprising:
a force applied point detection device provided in the steering wheel rim and configured to detect a force applied point gripped by an operator that is operating the steering wheel rim.

7. The device for detecting steering operation force according to claim 6, further comprising a force applied point correcting device configured to transform the component force detected by the input detection device to coordinates of a coordinate system centered on the force applied point, based on detection results of the force applied point detection device.

8. The device for detecting steering operation force according to claim 1, further comprising a control device configured to execute computations based on results detected by one or more of the input detection device, the steering angle detection device, and the inertial force component correcting device.

9. The device for detecting steering operation force according to claim 1, wherein the control device corrects the six component forces detected by the input detection device based on detection results of the steering angle detection device and a tilt angle detection device.

10. The device for detecting steering operation force according to claim 1, wherein the steering angle detection device comprises a rotary encoder and detects the steering angle by detecting an amount of displacement of rotation of the steering wheel with respect to a reference.

11. The device for detecting steering operation force according to claim 1, further comprising a tilt angle detection device configured to detect a tilt angle of the steering wheel, wherein the tilt angle detection device comprises a rotary encoder and detects the tilt angle by detecting an amount of displacement of rotation of the steering wheel with respect to a reference.

12. The device for detecting steering operation force according to claim 1, wherein the input detection device further comprises a plurality of load cells each having a sensor coordinate system centered thereon.

13. The device for detecting steering operation force according to claim 12, wherein the sensor coordinate system is a three-dimensional Cartesian coordinate system.

14. The device for detecting steering operation force according to claim 1, further comprising a gravitational force component correcting device configured to perform correction of a gravitational force component at least one of an x-axis direction, a y-axis direction, and a z-axis direction, wherein the gravitational force component in the x direction is expressed as $g_x = \sin\beta$, the gravitational force component in the y direction is expressed as $g_y = -\cos\beta \cdot \cos\delta$, and the gravitational force component in the z direction is expressed $g_z = \cos\beta \cdot \sin\delta$, wherein $\delta$ is the steering angle and $\beta$ is a steering wheel tilt angle.

15. The device for detecting steering operation force according to claim 1, further comprising a gravitational force component correcting device configured to perform correction of a gravitational force component with respect to the forces of the three axial directions detected by the input detection device, wherein the gravitational force component correcting device calculates the correction according to the following formula:

$$F_{SR1} = F_{SR} - m_g \cdot \vec{g}$$

$$= \begin{bmatrix} f_{SRx} \\ f_{SRy} \\ f_{SRz} \end{bmatrix} - \begin{bmatrix} m_g \cdot \sin\beta \\ -m_g \cdot \cos\beta \cdot \cos\delta \\ m_g \cdot \cos\beta \cdot \sin\delta \end{bmatrix} \begin{bmatrix} f_{SRx} - m_g \cdot \sin\beta \\ f_{SRy} + m_g \cdot \cos\beta \cdot \cos\delta \\ f_{SRz} - m_g \cdot \cos\beta \cdot \sin\delta \end{bmatrix}$$

wherein $\delta$ is the steering angle, $\beta$ is a steering wheel tilt angle, $F_{SR1}$ is a force after correction for one side of the steering wheel rim, $F_{SR}$ is the at least one component force, $m_g \cdot \vec{g}$ is a gravitational force component acting on the one side of the steering wheel rim, and $f_{SRx}$, $f_{SRy}$, and $f_{SRz}$ are respectively x, y, and z components of the force $F_{SR}$.

16. The device for detecting steering operation force according to claim 1, further comprising a gravitational force component correcting device configured to perform correction of the gravitational force component with respect to the moments about the three axial directions detected by the input detection device, wherein the gravitational force component correcting device calculates the correction according to the following formula:

$$M_{SR1} = M_{SR} - \vec{a_{gR}} \times (m_g \cdot \vec{g})$$

$$= \begin{bmatrix} m_{SRx} \\ m_{SRy} \\ m_{SRz} \end{bmatrix} - \begin{bmatrix} a_{gRx} \\ a_{gRy} \\ a_{gRz} \end{bmatrix} \times \begin{bmatrix} m_g \cdot \sin\beta \\ -m_g \cdot \cos\beta \cdot \cos\delta \\ m_g \cdot \cos\beta \cdot \sin\delta \end{bmatrix}$$

wherein $\delta$ is the steering angle, $\beta$ is a steering wheel tilt angle, $M_{SR1}$ is a moment after correction for one side of the steering wheel rim, $M_{SR}$ is the at least one component force, $m_g \cdot \vec{g}$ is a gravitational force component acting on the one side of the steering wheel rim, $m_g$ is a moment of gravity, $a_{gR}$ is a vector component, and $m_{SRx}$, $m_{SRy}$, $m_{SRz}$, $a_{gRx}$, $a_{gRy}$, and $a_{gRz}$ are are respectively x, y, and z components of $M_{SR}$ and $a_{gR}$.

17. The device for detecting steering operation force according to claim 1, wherein the inertial force component correcting device is configured to perform correction of a plurality of inertial force components with respect to the forces of the three axial directions detected by the input detection device using the following formula:

$\dot{\delta}$: STEERING ANGLE VELOCITY $\ddot{\delta}$: STEERING ANGLE ACCELERATION $$F_{SR1} = F_{SR} - \underbrace{(Lrc)\dot{\delta}^2 \cdot m_g \cdot \frac{\vec{a_{gR}}}{|\vec{a_{gR}}|}}_{\text{FIRST INERTIAL FORCE (CENTRIFUGAL FORCE)}} - \underbrace{(Lrc)\ddot{\delta} \cdot m_g \cdot \begin{bmatrix} 0 \\ 1 \\ 0 \end{bmatrix}}_{\text{SECOND INERTIAL FORCE}}$$

$$= \begin{bmatrix} f_{SRx} \\ f_{SRy} - (Lrc)\ddot{\delta} \cdot m_g \\ f_{SRz} - (Lrc)\dot{\delta}^2 \cdot m_g \end{bmatrix}$$

wherein $\delta$ is the steering angle, $\beta$ is a steering wheel tilt angle, $F_{SR1}$ is a force after correction for one side of the steering wheel rim, $F_{SR}$ is the at least one component force, $m_g$ is a moment of gravity, $a_{gR}$ is a vector component, $L_{rc}$ is a radius, and $f_{SRx}$, $f_{SRy}$, and $f_{SRz}$ are respectively x, y, and z components of the force $F_{SR}$.

18. The device for detecting steering operation force according to claim 1, wherein the inertial force component correcting device is configured to perform correction of a plurality of inertial force components with respect to the moments about the three axial directions detected by the input detection device using the following formula:

$$M_{SR1} = M_{SR} - \vec{a_{gR}} \times \underbrace{\left( (Lrc)\ddot{\delta} \cdot m_g \cdot \begin{bmatrix} 0 \\ 1 \\ 0 \end{bmatrix} \right)}_{\text{MOMENT CAUSED BY SECOND INERTIAL FORCE}}$$

$$= \begin{bmatrix} m_{SRx} \\ m_{SRy} \\ m_{SRz} \end{bmatrix} - \begin{bmatrix} a_{gRx} \\ a_{gRy} \\ a_{gRz} \end{bmatrix} \times \begin{bmatrix} 0 \\ Lrc \cdot \ddot{\delta} \cdot m_g \\ 0 \end{bmatrix}$$

$$= \begin{bmatrix} m_{SRx} + Lrc \cdot \ddot{\delta} \cdot m_g \cdot a_{gRz} \\ m_{SRy} \\ m_{SRz} - Lrc \cdot \ddot{\delta} \cdot m_g \cdot a_{gRx} \end{bmatrix}$$

wherein $\delta$ is the steering angle, $\beta$ is a steering wheel tilt angle, $\ddot{\delta}$ is a steering angle acceleration, $M_{SR1}$ is a moment after correction for one side of the steering wheel rim, $M_{SR}$ is the at least one component force, $m_g$ is a moment of gravity, $a_{gR}$ is a vector component, $L_{rc}$ is a radius, and $M_{SRx}$, $M_{SRy}$, $M_{SRz}$, $a_{gRx}$, $a_{gRy}$, and $a_{gRz}$ are respectively x, y, and z components of $M_{SR}$ and $a_{gR}$.

19. The device for detecting steering operation force according to claim 1, further comprising a grip in the steering wheel rim and a force applied point detection device provided in the grip, the force applied point detection device being configured to detect a force applied point gripped by an operator that is operating the steering wheel rim.

20. The device for detecting steering operation force according to claim 1, further comprising a plurality of force applied point detection sensors evenly spaced along a circumferential direction of the steering wheel rim, the plurality of force applied point detection sensors being connected to a control device configured to identify a force applied point based on detection results of the plurality of force applied point detection sensors.

* * * * *